(12) United States Patent
Marsilio et al.

(10) Patent No.: US 7,167,096 B2
(45) Date of Patent: Jan. 23, 2007

(54) SECURITY COLLAR FOR MEDIA DISCS

(75) Inventors: Ronald M. Marsilio, Lake Wylie, SC (US); Christopher J. Fawcett, Charlotte, NC (US)

(73) Assignee: Alpha Security Products, Inc., Charlotte, NC (US)

( * ) Notice: Subject to any disclaimer, the term of this patent is extended or adjusted under 35 U.S.C. 154(b) by 206 days.

(21) Appl. No.: 11/027,209

(22) Filed: Dec. 30, 2004

(65) Prior Publication Data
US 2006/0152371 A1    Jul. 13, 2006

(51) Int. Cl.
*G08B 13/14* (2006.01)

(52) U.S. Cl. ................. 340/572.9; 340/572.8; 340/567.1; 340/572.1; 340/568.8; 206/307; 206/310

(58) Field of Classification Search ............. 340/572.9, 340/572.8, 568.1, 571, 572.1, 568.8; 206/307, 206/310; 312/9.41
See application file for complete search history.

(56) References Cited

U.S. PATENT DOCUMENTS

| | | | | |
|---|---|---|---|---|
| 5,426,419 | A * | 6/1995 | Nguyen et al. | 340/572.9 |
| 6,373,390 | B1 * | 4/2002 | Hogan et al. | 340/572.8 |
| 6,535,130 | B1 * | 3/2003 | Nguyen et al. | 340/572.9 |
| 6,820,741 | B1 * | 11/2004 | Ferguson et al. | 206/310 |
| 7,023,348 | B1 * | 4/2006 | Hogan et al. | 340/572.8 |

* cited by examiner

*Primary Examiner*—Toan N. Pham
(74) *Attorney, Agent, or Firm*—Sand & Sebolt (57) ABSTRACT

A security collar for placement around the base of a display package to prevent removal of a cover from the base to protect merchandise contained therein. An EAS security tag is contained in the collar. A magnetically actuated lock mechanism is formed on the collar to lock the collar in a closed locked position on the display package. The collar includes a pair of semi-circular housing members pivotally joined at one end and swingable between open and closed positions. The collar is formed with spaced projections which trap the base and portions of the cover therebetween to secure the collar about the base and cover. Each of the housing members each locking teeth which mutually engage each other to secure the housing members in locked position.

20 Claims, 11 Drawing Sheets

SECURITY COLLAR FOR MEDIA DISCS

BACKGROUND OF THE INVENTION

1. Technical Field

The invention relates to security devices, and in particular, to a security collar adapted to be mounted about the base of a display package which contains a plurality of media discs stacked on the base and having a protective cover thereon. Even more particularly, the invention relates to such a security collar containing an EAS tag and having a magnetically actuated locking mechanism for securing the collar in a locked position about the display package.

2. Background Information

Various types of packages have been developed for the display and sale of media discs, and in particular, for media discs intended for receiving recordable information thereon. One common type of display package for such discs involves a circular base having a central post for holding a plurality of the stacked discs. The stacked discs are then covered by an outer cover afterwhich both the base and cover are secured in a shrinkwrap to prevent unlatching of the base and cover and stealing the discs therefrom.

Often various prior art items of merchandise have an article surveillance tag (EAS) placed on the article in an attempt to protect the article from theft. Usually, some attempt is made to hide the EAS tag within the article, although many articles do not contain sufficient hiding places and even where hiding places exist, the process of hiding and/or later removing the tag is often cumbersome. In general, these tags have had some success in curbing theft. However, some shoplifters and thieves have recognized that these tags are often easy to remove, sometimes as simply as peeling them off and/or to circumvent the effect of the tag by various means while exiting through the store detector.

Thus, the need exists for a reusable security device which is easily placed about the media disc display package, which will prevent removal of the cover from the base of the package even should the thief remove the shrinkwrap applied thereto, which will contain an EAS tag that is not detectable or accessible to the thief, and in which the security device containing the EAS tag is easily removed at the checkout counter without disturbing the shrinkwrap, and which can be easily reapplied to another similarly shaped display package for media discs.

BRIEF SUMMARY OF THE INVENTION

One aspect of the invention includes providing an improved security device for use with articles of merchandise offered for sale in usual retail venues, and in particular where the display package has a circular base which is enclosed by the security collar of the present invention.

Another aspect of the invention includes providing an improved security device capable of being sized to various types of articles, preferably a type having a circular base around which the article can be placed to prevent removal of a protective cover from the base or performing other illegal functions thereon which would provide access to the articles of merchandise contained therein.

Still another feature of the invention includes providing an improved security device that is easy to place on and remove from the display package and which can be manually reused by retail shop personnel.

Still a further feature of the invention includes providing a security device which can be molded of rugged plastic material that is very difficult to break, rip, or otherwise remove from the package and which contains the EAS tag which actuates an alarm upon moving through a security gate.

A further aspect of the invention includes providing a security collar formed by a pair of pivotally joined semi-circular housing members which are secured in a locked position by a plurality of fingers, one set of which is slidably mounted on one of the housing members, and when in the locked position is secured by one or more magnetically attractable locking members which are biased towards the locking position.

Still another feature of the invention is to provide such a security collar in which a magnetic key must be accurately placed on the collar in order to effectively move locking members from the locked to the unlocked position thereby preventing a generic type of magnet from being effective should a thief attempt to unlock the collar illegally.

These features are obtained by the improved security collar of the present invention which is used on a merchandise display package having a base and a closure cover forming a container for holding the merchandise, wherein the general nature of the security collar comprises a pair of housing members joinable together in a locked position and moveable between open and closed positions; a magnetically actuated lock mechanism carried by the collar for locking the housing members in the closed position; a security tag carried by the collar; and spaced projections formed on the housing members for trapping the base and cover of the display package therebetween when the housing members are in the locked position.

BRIEF DESCRIPTION OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
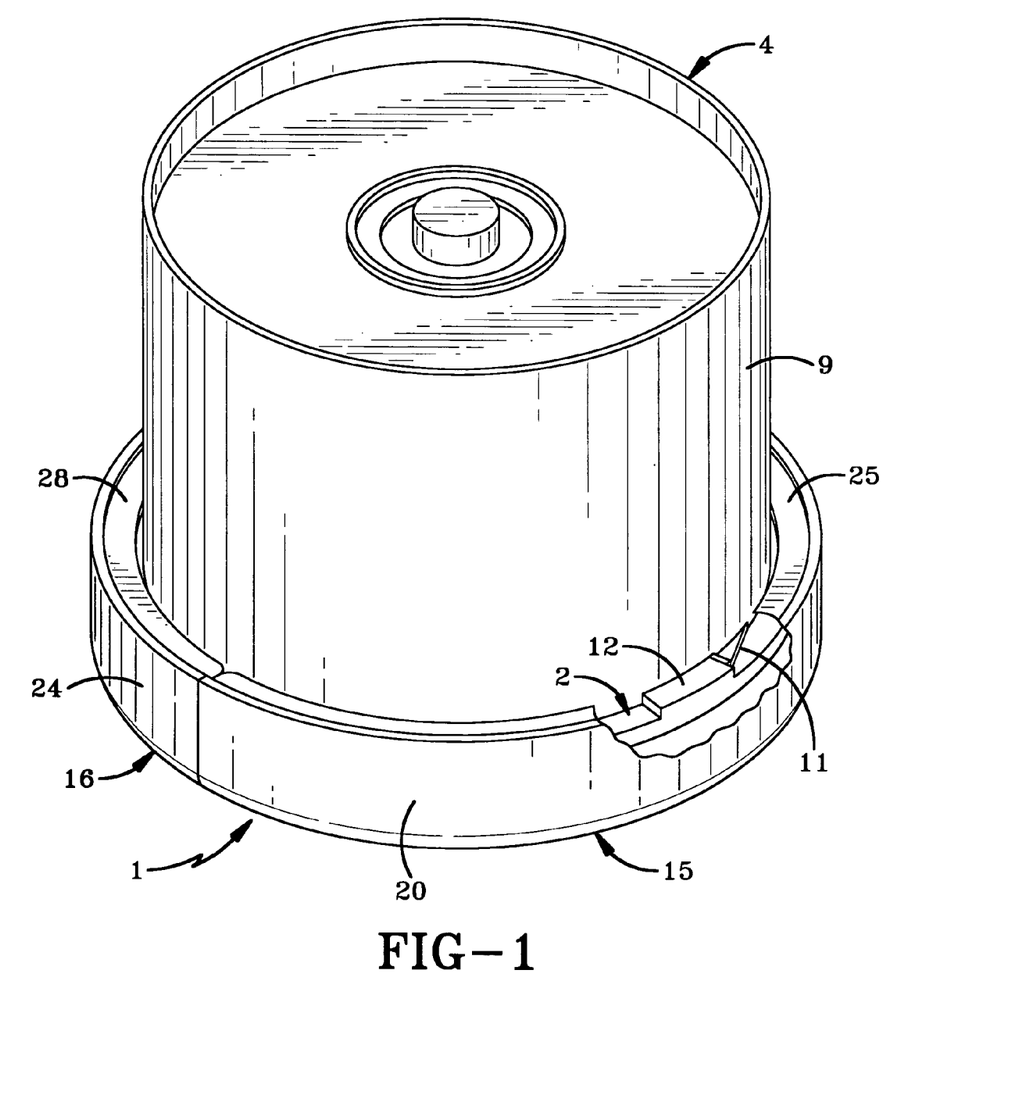
FIG. 1 is a perspective view with portions broken away showing the security collar of the present invention in a locked position about the base of a package containing a plurality of media discs.
Figure 12:
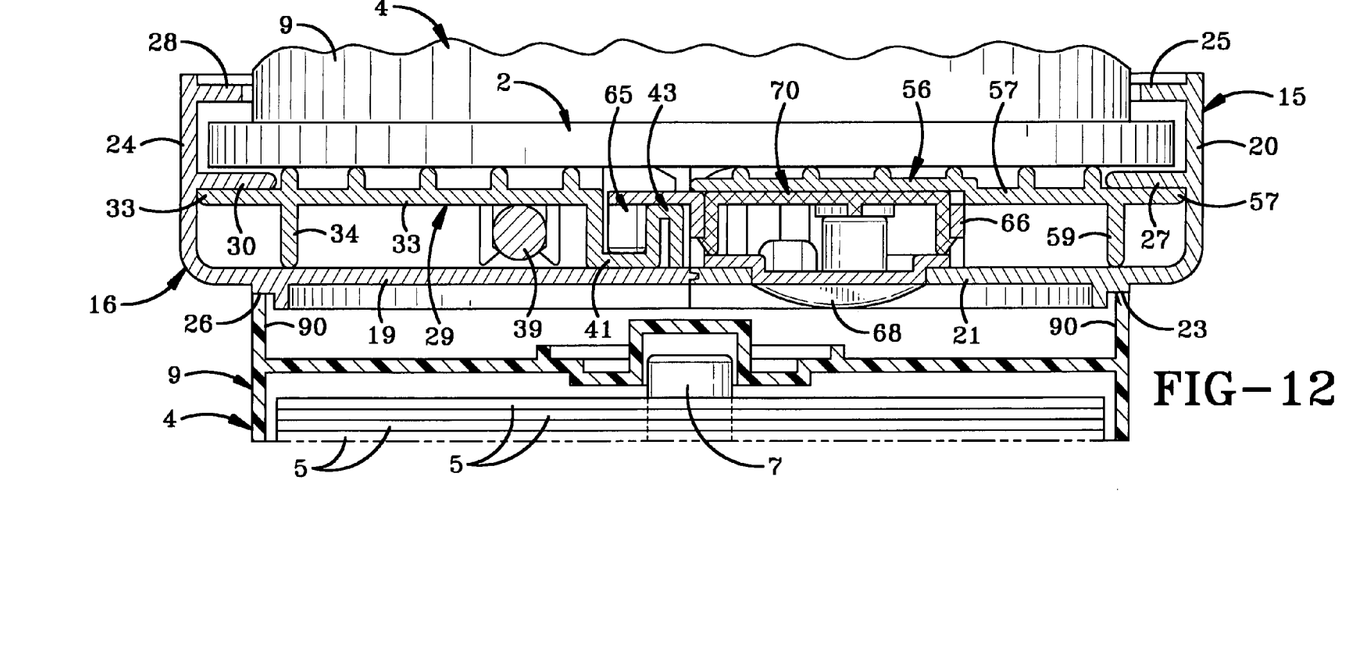
FIG. 12 is a sectional view of the security collar in a locked position similar to FIG. 4, showing a second media disc package mounted in a stacked relationship thereon.

The security collar of the present invention is indicated generally at 1, and is mounted about the base 2 of a display package indicated generally at 4, for holding a plurality of stacked discs 5 on a central post 7 which extends upwardly from base 2 (FIGS. 1 and 12). A cover 9 is placed over the discs and latched to base 2 by mutually engaged latching tabs 11 and 12 formed on cover 9 and base 2 respectively, upon rotation of cover 9 on base 2. After the plurality of discs 5 are placed about central post 7 and cover 9 latched to base 2, the packages then are covered with a transparent plastic wrap, usually a heat shrinkwrap (not shown), to prevent unauthorized removal of the cover from the base and subsequent theft of the discs stored therein. However, this is easily defeated by use of a sharp instrument to remove the shrinkwrap and unlatch the cover from the base to steal all or some of the discs.

Figure 2:
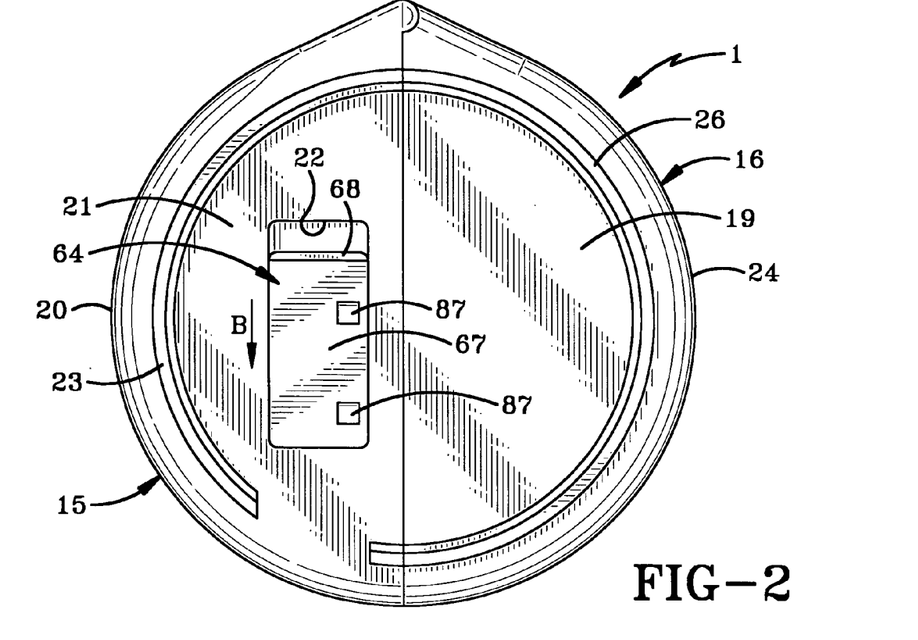
FIG. 2 is a bottom plan view of FIG. 1.
Figure 7:
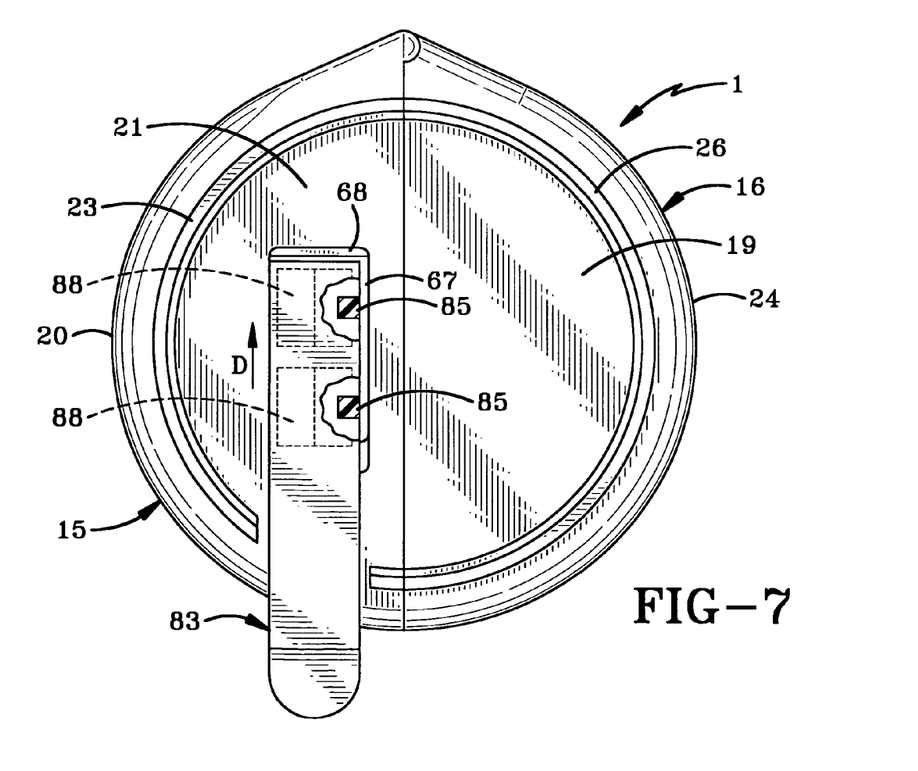
FIG. 7 is a bottom plan view of the security collar with the magnetic key engaging the security collar and being moved toward the unlocked position.
Figure 11:
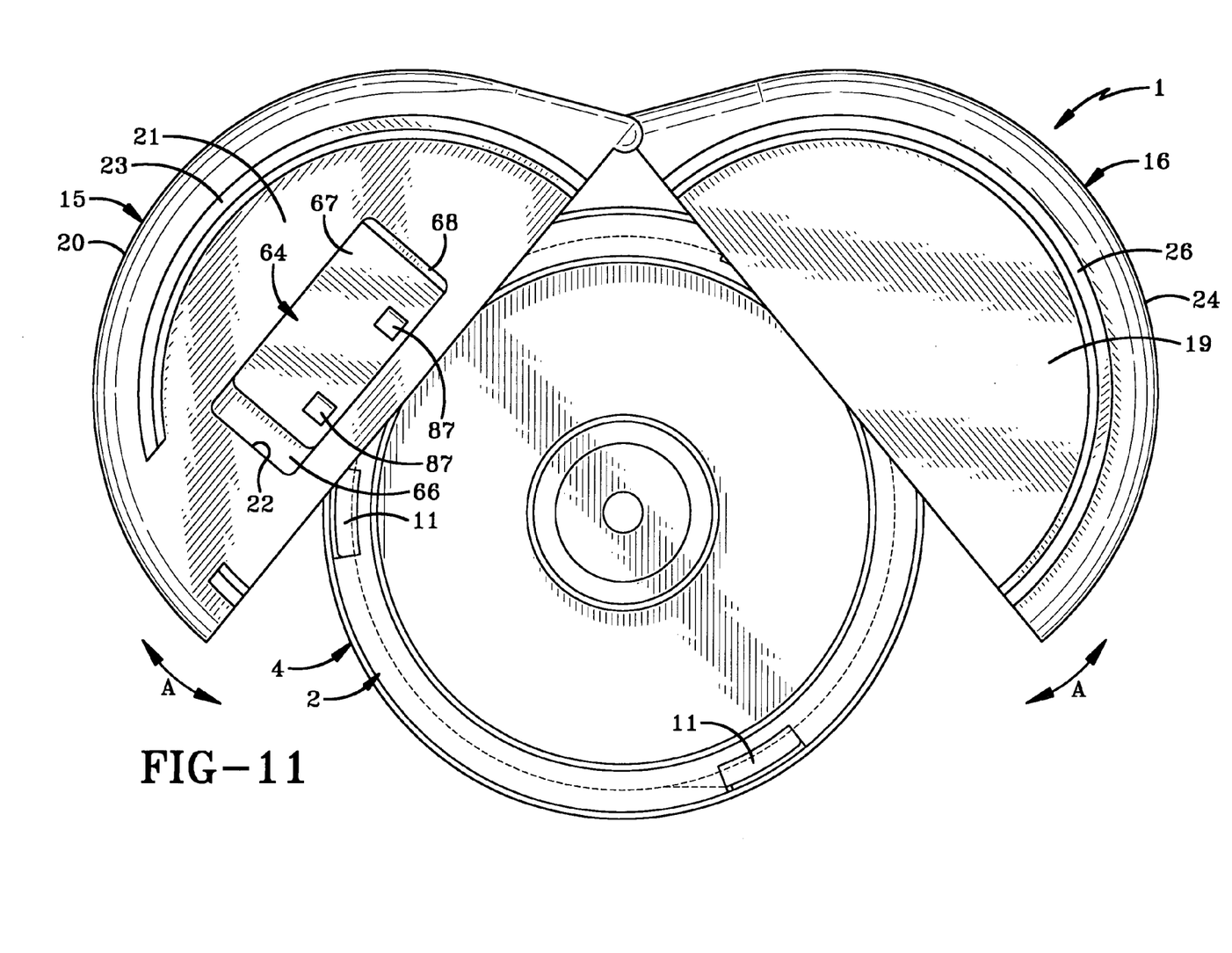
FIG. 11 is a bottom plan view showing the housing members being moved toward an open position as shown in FIG. 10.

Security collar 1 of the present invention includes a pair of semi-circular housing members 15 and 16 best shown in FIGS. 2, 3H, 7, and 11, which are pivotally joined at one end by pivot pin 18 (FIG. 3) and swingable with respect to each other as shown by Arrow A between an open unlocked position in FIG. 11 and a closed locked position as shown in FIGS. 1, 2, and 7.

Figure 3:
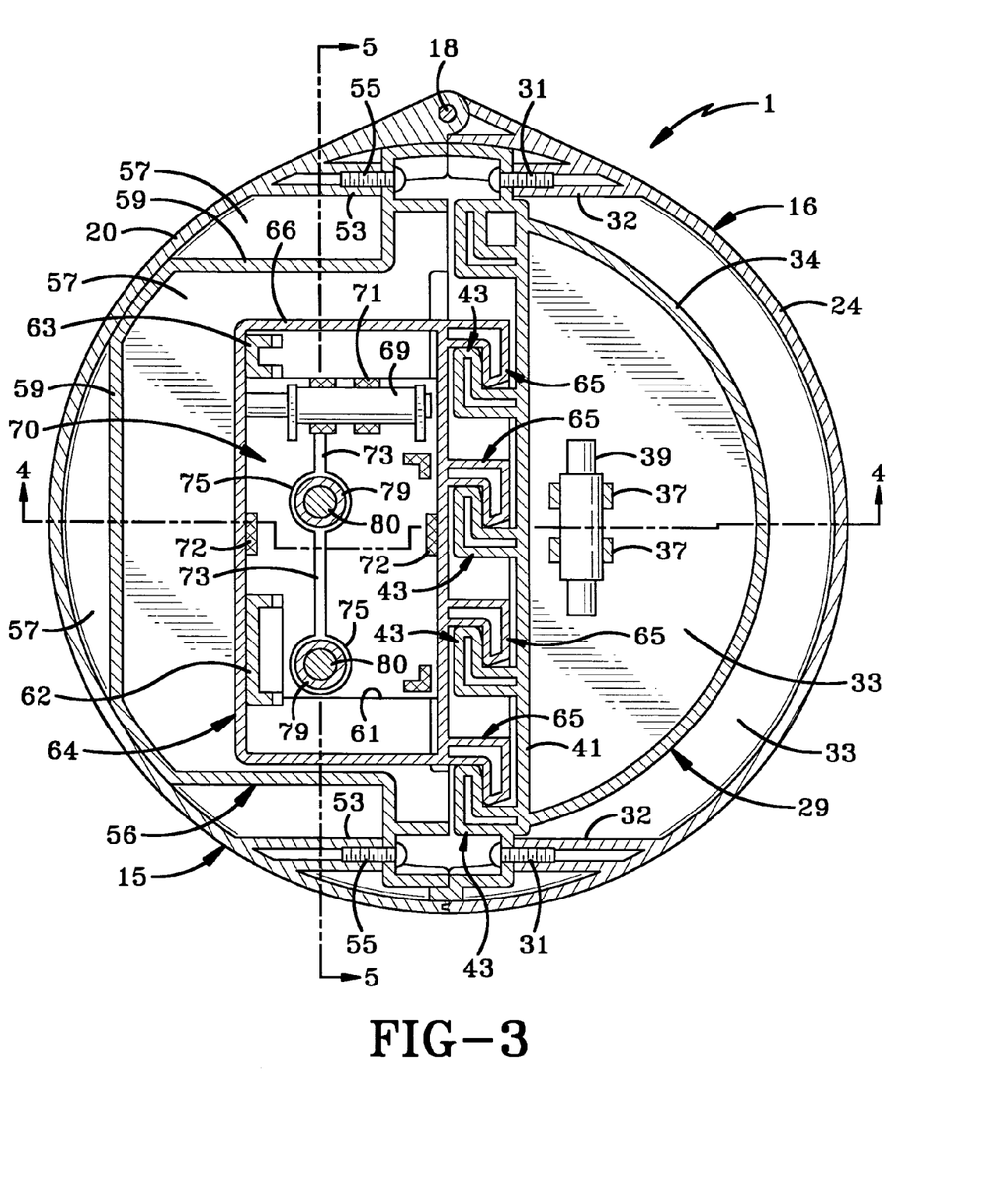
FIG. 3 is a sectional view of the security collar taken on line 3—3, FIG. 4 with the collar in locked position.

Left side housing member 15 (FIGS. 3 and 3H) includes an outer generally semi-circular side wall 20 which merges with and surrounds a central panel 21 formed with an elongated rectangular shaped opening 22, and which includes an outwardly projecting nearly semi-circular reinforcing rib 23. Outer sidewall 20 is formed with a semi-circular shaped internal lower retaining rib or projection 25 which extends inwardly therefrom, and has a chordal-shaped projection 27 (FIG. 3H) spaced from rib 25 and located generally at the center of curvature of the side wall, which when the security collar is in a closed locked position trap base 2 between rib 25 and projection 27 (FIG. 4).

Figure 3A:
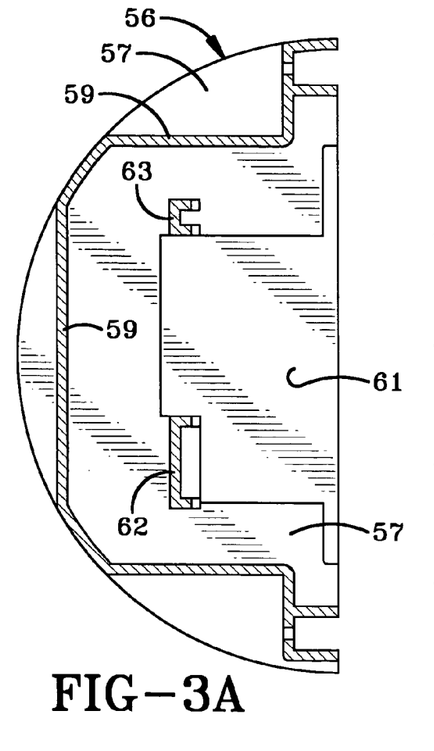
FIG. 3A is a slightly reduced plan view with portions in section, of the left cover plate removed from the left side housing member of FIG. 3.
Figure 3B:
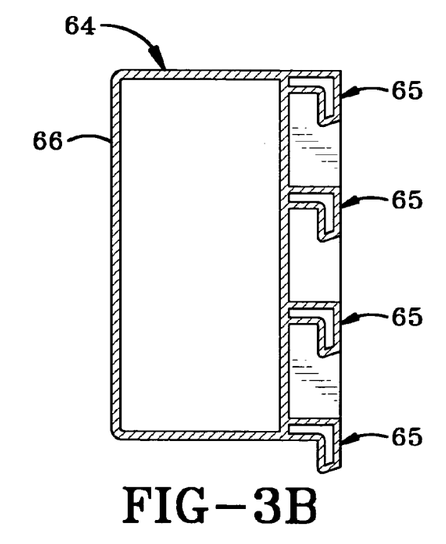
FIG. 3B is a slightly reduced plan view with portions in section, of the slider containing the locking teeth removed from the left side housing member of FIG. 3.
Figure 3C:
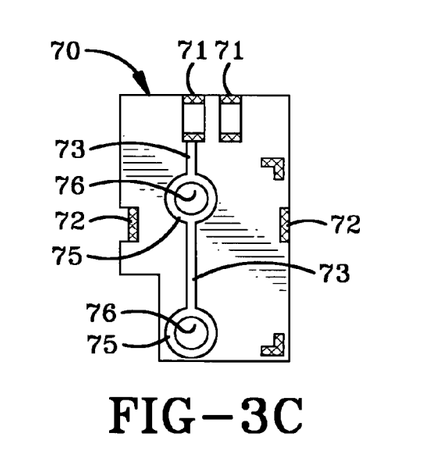
FIG. 3C is a slightly reduced plan view with portions in section, of the slide plate removed from the left side housing member of FIG. 3.
Figure 3D:
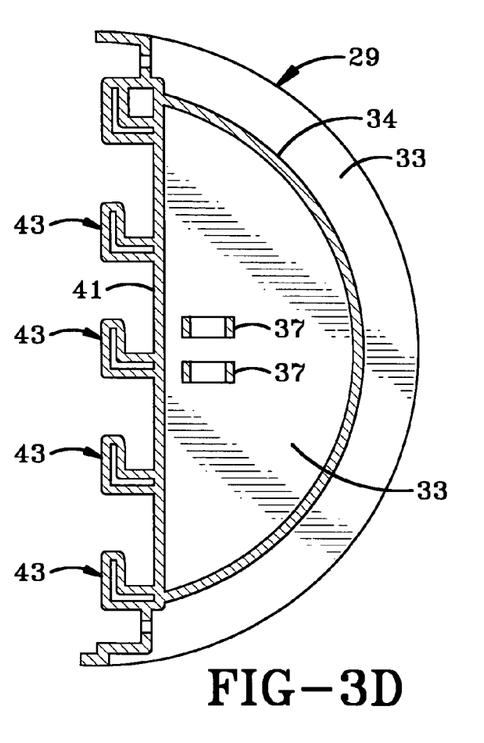
FIG. 3D is a slightly reduced plan view with portions in section, of the right cover plate removed from the right side housing member of FIG. 3.
Figure 3E:
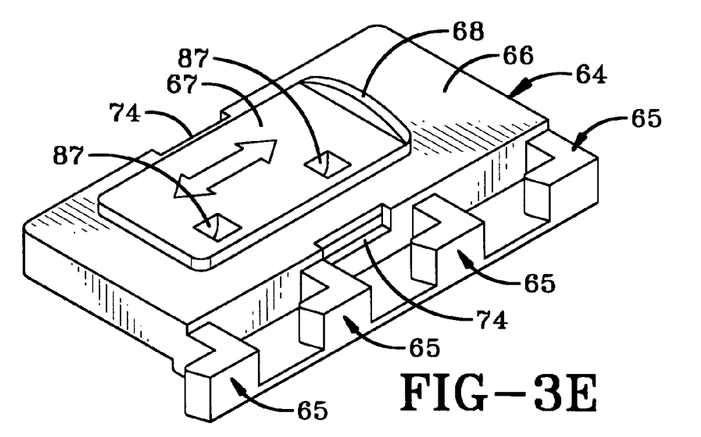
FIG. 3E is a perspective view of the slider shown in section in FIG. 3B.
Figure 3F:
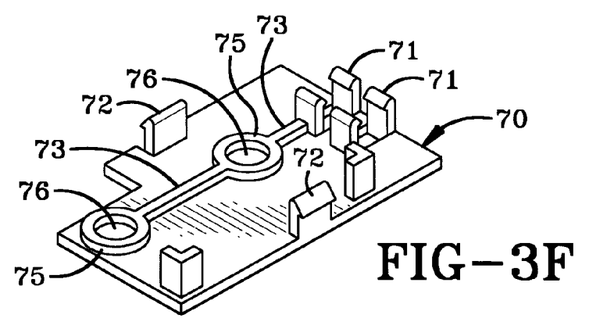
FIG. 3F is a perspective view of the slide plate shown in elevation in FIG. 3C.
Figure 3G:
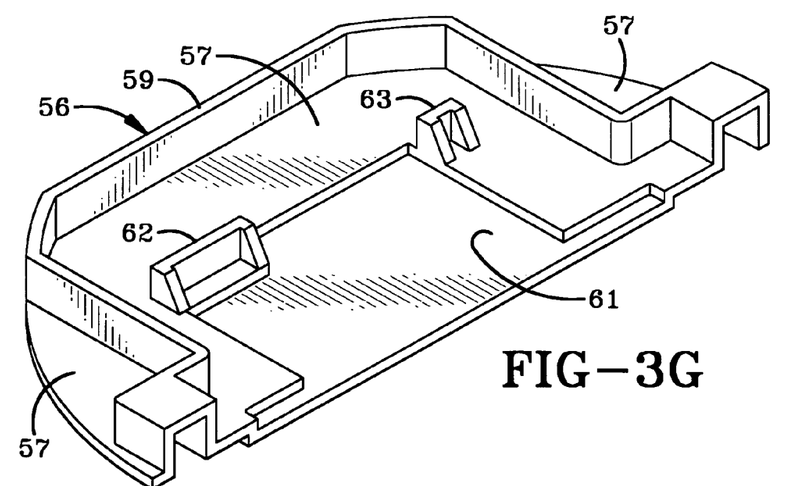
FIG. 3G is a perspective view of the cover plate shown in section and elevation in FIG. 3A.
Figure 3H:
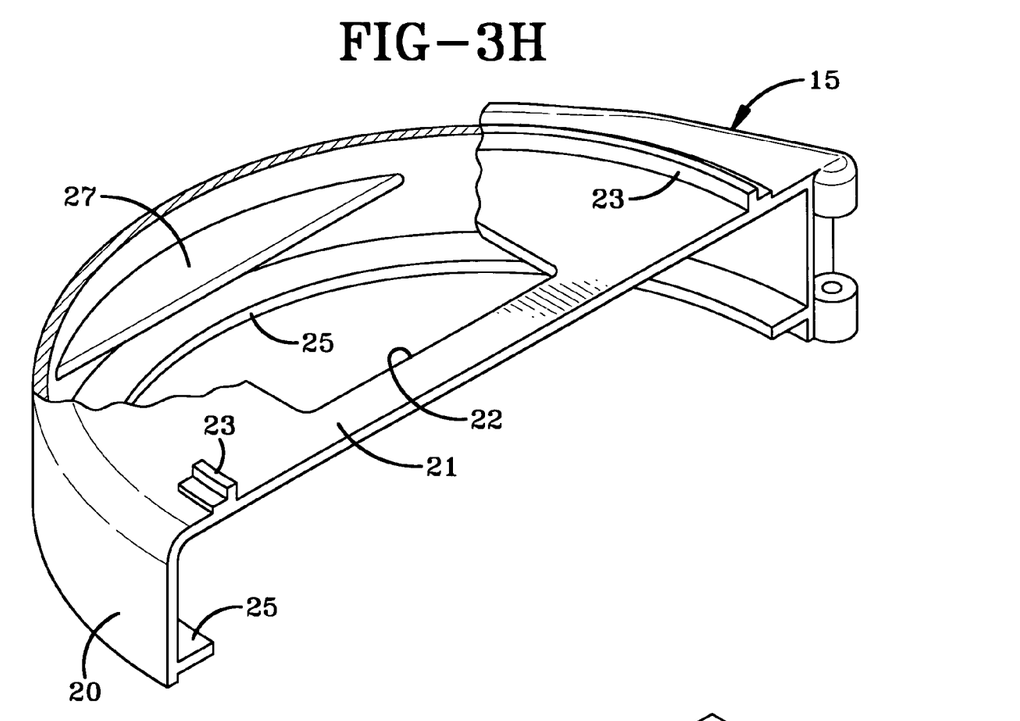
FIG. 3H is a perspective view with portions broken away of the left side housing member of FIG. 2.
Figure 4:
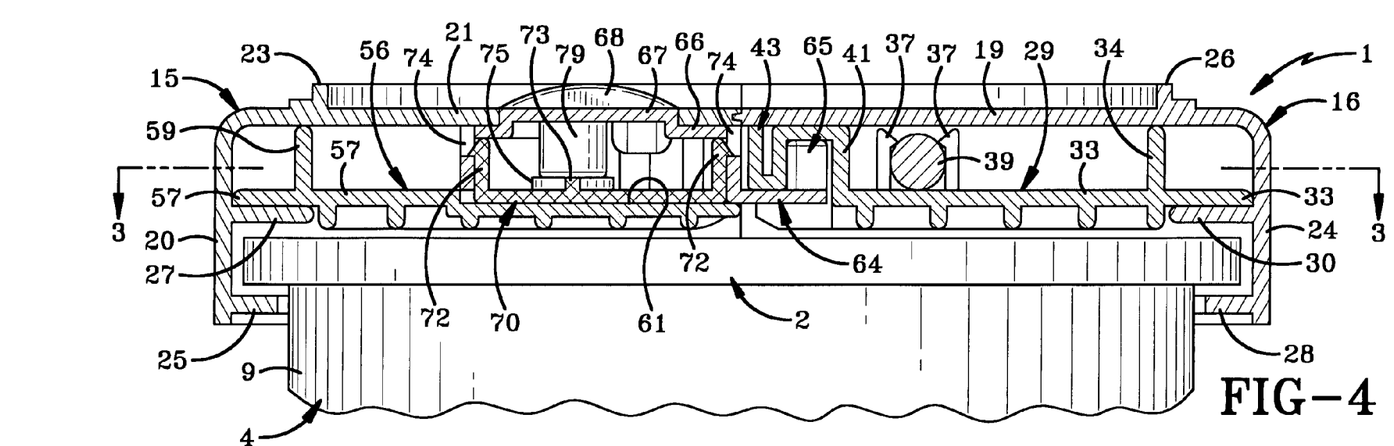
FIG. 4 is an enlarged sectional view taken on line 4—4, FIG. 3, with the media disc package being shown in fragmentary elevation and with the security collar being shown in locked position.

Right side housing member 16 (FIG. 3) is similar in shape and size to left side housing member 15 as shown in FIG. 3H and includes a central panel 19 but does not have an opening 22 formed therein. Housing member 16 (FIG. 4) includes a generally semi-circular side wall 24 and a lower internal semi-circular rib or projection 28, a chordal-shaped projection 30 which is similar to projection 27 of housing member 15, and a raised semi-circular rib 26 extending upwardly from a central panel 19, similar to side wall 20, rib 25, projection 27, and rib 23 of housing member 15.

Figure 3I:
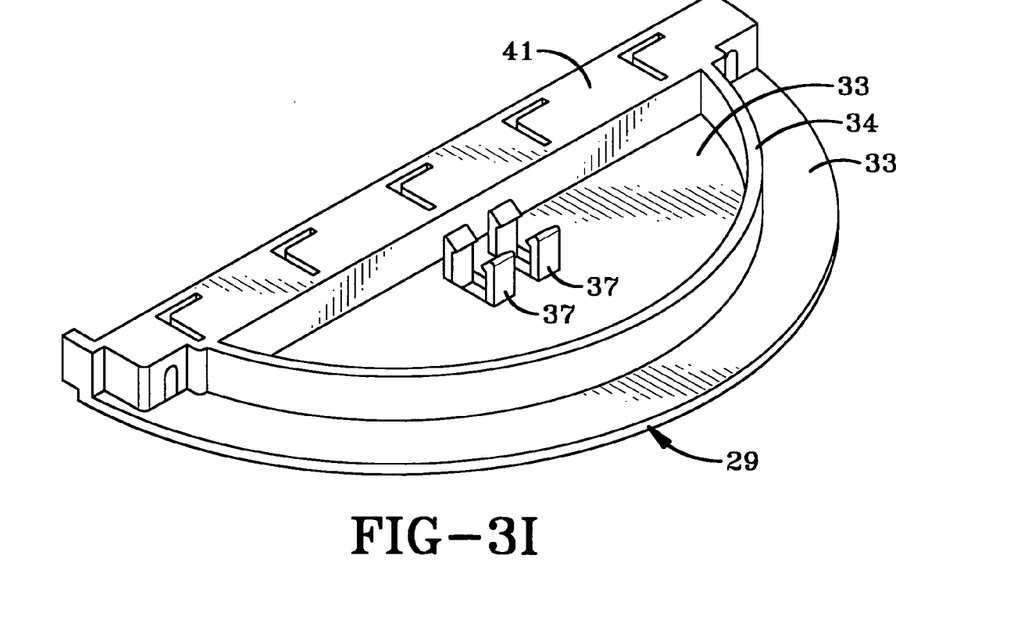
FIG. 3I is a perspective view of the right side cover plate shown in section and elevation in FIG. 3D.

A locking finger plate 29 (FIGS. 3, 3D, and 3I), which has a generally semi-circular shape but of a smaller diameter than housing member 16, is secured to the inside of housing member 16 by a pair of screws 31 which extend into a pair of bosses 32 formed on housing member 16 (FIG. 3). Locking finger plate 29 includes a central semi-circular panel 33 and a semi-circular rib 34 which projects outwardly therefrom and engages the underside surface of the central panel 19 of housing member 16 as shown in FIG. 4. A plurality of reinforcing ribs 35 are formed on and extend outwardly from the opposite side of central panel 33 than that of rib 34. A pair of flexible tabs 37 are formed on central panel 33 and project outwardly therefrom for receiving an EAS tag such as an RF coil 39 therein (FIG. 3). An L-shaped reinforcing rib 41 (FIG. 3I) extends between the ends of and across semi-circular rib 34 and has a plurality of L-shaped locking fingers or teeth, each of which is indicated generally at 43, formed integrally therewith and extending outwardly therefrom, four of which are shown in the particular embodiment in FIG. 3D.

Housing member 16 is semi-circular shaped and complimentary in size and shape to that of housing member 15 and in which spaced projections 28 and 30 (FIG. 4) trap and secure base 2 of the display package therebetween when in the closed locked position. Projections 25, 27, 28, and 30 when in the locked position, as shown in FIG. 4, prevent the removal of collar 1 from the base of the display package and also prevents the removal of cover 9 from base 2 even should the shrinkwrap be removed since latching projections 11, which extend outwardly from cover 9, will be trapped between these spaced projections of collar 1.

Housing member 15 is formed with a pair of bosses 53 (FIG. 3) similar to bosses 32 of housing member 16, for receiving screws 55 therein for attaching a cover plate 56 thereto (FIGS. 3, 3A and 3G). Cover plate 56 has a generally semi-circular panel 57 which is generally complimentary in shape and size to the inside surface of housing member panel 21, and includes a generally rectangular shaped rib 59 with a generally rectangular shaped recess 61 being formed in panel 57 within rib 59. A pair of projections 62 and 63 located at the corners of recess 61, extend outwardly from panel 57.

Housing member 15 further includes a lock slider 64 (FIGS. 3B and 3E) which is formed with a plurality of L-shaped locking fingers or teeth 65, which are generally similar in shape and size, and complimentary to locking fingers 43 of cover plate 29 of housing member 16. Slider 64 further includes a rectangular base 66, a raised key pad 67, and a finger tab 68 projecting upwardly from pad 67. Slider 64 is slidably mounted on a slide plate indicated generally at 70 (FIGS. 3C and 3F), which is complimentary to and located within recess 61 of cover plate 56. Slide plate 70 is formed with a pair of flexible tabs 72 which snap-fit into larger slots 74 of slider 64 to attach slider 64 to slide plate 70 while permitting sliding movement of slider 64 thereon when moving between locked and unlocked positions. Slide plate 70 may also be formed with a pair of flexible tabs 71 for receiving another EAS coil 69 (FIG. 3) if required. Slide plate 70 is formed with a raised linear rib 73 and a pair of small circular bosses 75 which form circular holes or apertures 76 therein, the function of which are discussed further below.

Figure 8:
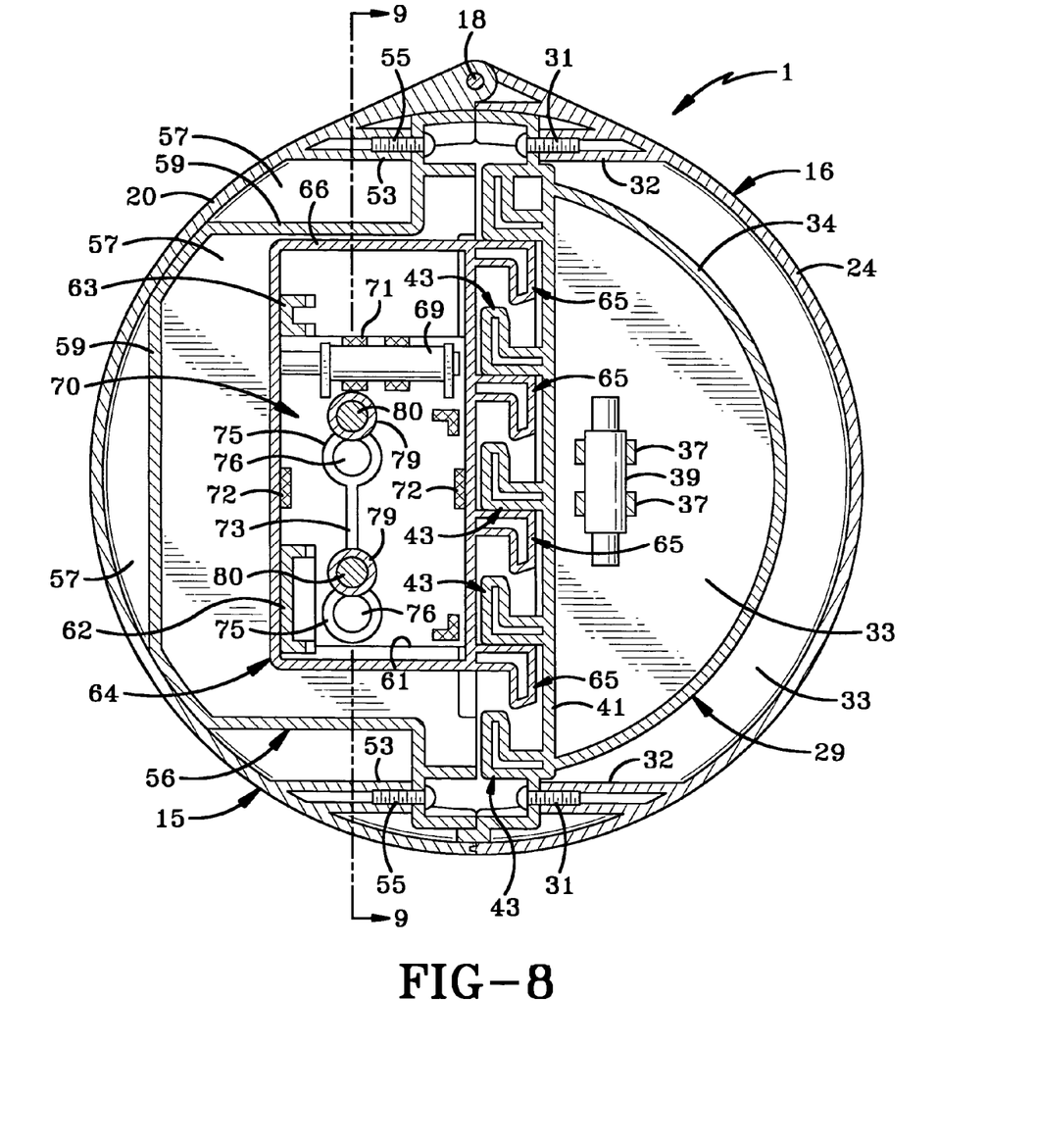
FIG. 8 is a sectional view similar to FIG. 3 showing the slider of FIG. 3B being moved to the unlocked position.

When housing member 15 is in an assembled position, as shown particularly in FIGS. 3, 5, 6, 8, and 9, slide plate 56 is trapped in recess 61 of cover plate 56 and lock slider 61 is slidably moveable linearly along the top surface of raised rib 73 between a locked position of FIG. 3 and an unlocked position of FIG. 8. Key pad 67 projects upwardly through opening 22 which is similar in shape but slightly longer as shown in FIG. 2 to permit sliding movement of key pad 67 therein as slider 64 moves between locked and unlocked positions.

Figure 5:
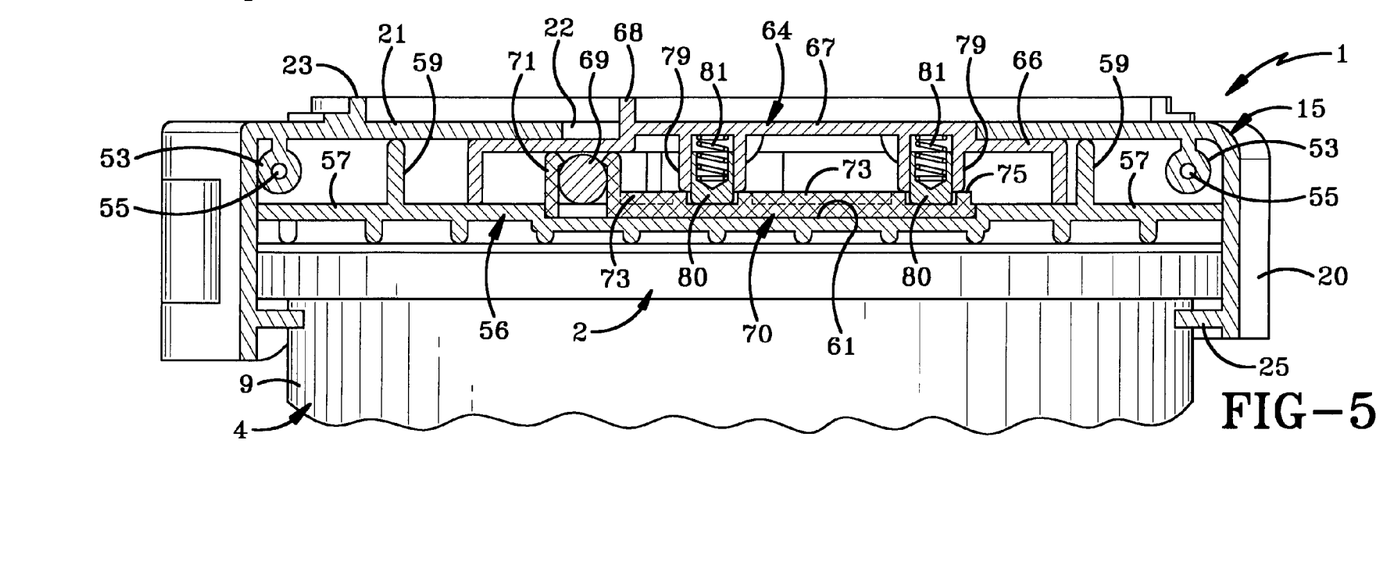
FIG. 5 is a sectional view taken on line 5—5, FIG. 3, with the media disc package shown in fragmentary elevation and the security collar in locked position.

In further accordance with the invention, a locking mechanism is provided for securing the housing members 15 and 16 in a closed locked position. This mechanism is shown particularly in FIGS. 5, 6, and 9 and includes a pair of circular bosses 79 formed integrally with and extending downwardly from base 66 of slider 64. A magnetically attractable plunger 80 is slidably mounted in each boss 79 and is spring biased by coil spring 81 in an outward locking direction for engagement in apertures 76 of slide plate 70 to secure slider 64 in locked position as shown in FIGS. 3 and 5.

Figure 10:
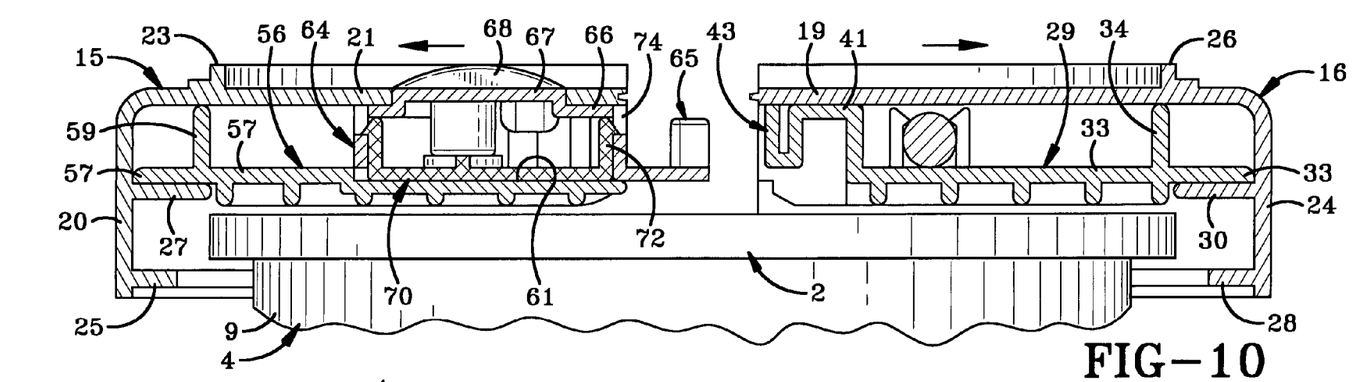
FIG. 10 is a sectional view showing the left and right side housing members being pivoted to an open unlocked position.

The operation of collar 1 and its method of use with package 4 is as follows. Collar 1 is moved to an open position such as shown in FIGS. 10 and 11, by pivotally swinging housing members 15 and 16 on pivot pin 18 to an open position for placement about base 2 of collar 4. The two housing members are then moved together to the position as shown in FIG. 8, which is a closed unlocked position, which will trap base 2 and cover 9 between flanges 25, 27, 28, and 30 as shown in FIG. 4.

To lock housing members 15 and 16 in the closed position, an operator will slide key pad 67 by means of finger tab 68, in the direction of Arrow B (FIG. 2) until it reaches the position shown therein which will move slider 64 from the open position of FIG. 8 to the locked position of FIG. 3. Plungers 80 will slide along the top surface of rib 73 until aligning with holes 76 where they will automatically project into holes 76 by the force of springs 81 as shown in FIG. 5, where they prevent further movement of the slider and retains it in the locked position, in which position teeth 65 of slider 64 will have moved into mating locking engagement with teeth 43 of cover plate 29 as shown in FIG. 3. This prevents any pivotal opening movement of housing members 15 and 16, securing them about base 2 and cover 9.

Figure 6:
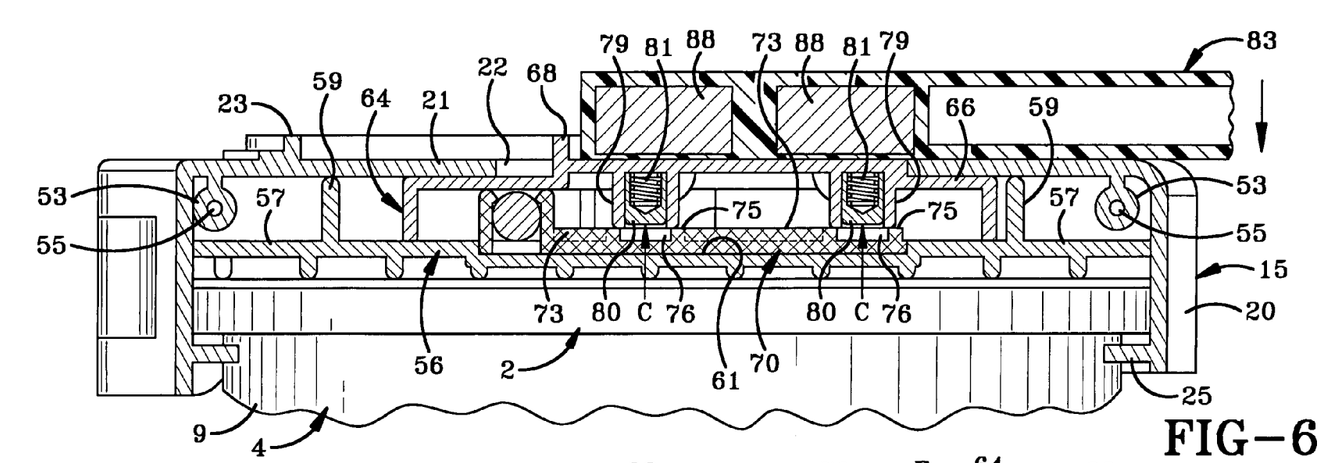
FIG. 6 is a sectional view similar to FIG. 5 showing a magnetic key moving the locking plungers from locked to unlocked position.
Figure 9:
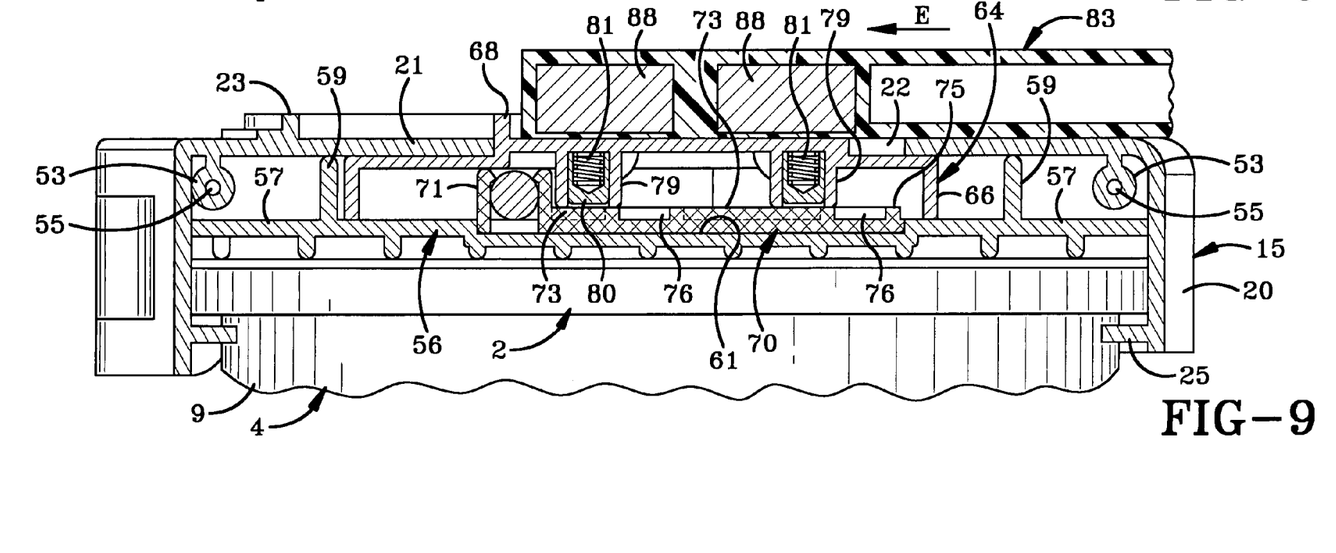
FIG. 9 is a sectional view taken on line 9—9, FIG. 8.

In accordance with still another feature of the invention, a magnetic key indicated generally at 83, preferably having two locating pins or tabs 85 extending outwardly therefrom (FIG. 7), are placed into alignment holes 87 (FIG. 2), which are formed in slider 64 as shown in FIG. 3E. This alignment ensures that two magnets 88 contained within key 83 are in alignment with magnetically attractable plungers 80 as shown in FIGS. 6 and 9. The magnets will move plungers 80 upwardly in the direction of Arrow C (FIG. 6), and out of locking holes 76 formed in slide plate 70. The operator then will move magnetic key 83 and slider 64 therewith in the direction of Arrow D (FIG. 7), which corresponds to direction Arrow E of FIG. 9. This movement will move locking fingers 65 of slider 64 linearly from the locked position of FIG. 3 to the unlocked position of FIG. 8 where they are disengaged from locking fingers 43 of cover plate 29. Upon reaching the unlocked position of FIG. 8, the two housing members 15 and 16 can then be pivoted toward the open position as shown in FIG. 11, enabling the collar to be removed from package 4. This unlocking and opening movement can be performed in a matter of seconds as well as the subsequent placement of collar 1 onto another package 4 followed by the subsequent sliding movement of slider 64 from the unlocked to the locked position. Thus, a retail clerk can easily remove security collar 1 from a package 4 by the use of magnetic key 83, and then reuse collar 1 on another package before placement of the protected package on a display shelf in a relatively simple and quick procedure.

The term "locked" refers to the relationship between elements that requires a key to undue and is distinguishable from the term "latch", where the relationship between two elements does not require a key to undue and thus may be undone by anyone at anytime.

The security tags 39 and 69 can be of various types such as radio frequency sensitive (RF) or magnetically sensitive (AM), or other types of known security tags which can be placed at various locations within the collar such as represented by RF coils 39 and 69. These EAS tags are securely hidden and retained within the interior of the collar, and thus are not accessible to a potential thief for tampering and disarming or removing the same.

Likewise, in accordance with a further feature of the invention, ribs 23 and 26 which extend outwardly from housings 16 and 15 respectively, provide for the centering and nesting of an adjacent package 4 as shown in FIG. 12, enabling a plurality of packages 4 having collars 1 attached thereto to be placed in a stacked relationship. The top end of cover 9 for many such packages 4 will have an outwardly projecting annular rib 90 formed thereon which is generally concentric to and aligned to receive ribs 23 and 26 therein to provide stability to adjacent packages 4 when placed in the stacked relationship of FIG. 12.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A security collar for a merchandise display package having a base and a closure cover forming a container for holding merchandise, said collar comprising:
   a pair of housing members joinable together and moveable between open and closed positions;
   a magnetically actuated lock mechanism carried by the collar for locking the housing members together in the closed position;
   a security tag carried by the collar; and
   spaced projections formed on the housing members for trapping the base and cover of the display package therebetween when the housing members are in the locked position.

2. The security collar defined in claim 1 wherein one of the housing members includes a slide plate and a slider slidably mounted for linear movement on said slide plate, said slider being provided with a plurality of locking fingers lockingly engageable with a plurality of locking fingers fixed on the other housing member to secure the housing members in locked position.

3. The security collar defined in claim 2 wherein the slide plate is formed with at least one locking aperture; in which the slider includes at least one magnetically attractable locking plunger spring biased toward locking engagement in the locking aperture when said slider is moved to a locking position on said slide plate.

4. The security collar defined in claim 3 wherein the spring biased plunger is mounted with a boss; in which the slide plate has a slide rib slidably engaged by the plunger boss as the slider is moved linearly between locked and unlocked positions.

5. The security collar defined in claim 3 in which the slide plate is formed with a pair of locking apertures and the slider includes a pair of spring biased locking plungers mutually engageable with said apertures when in locked position.

6. The security collar defined in claim 2 wherein the other housing member includes a cover plate attached to said other housing member; in which the locking fingers are formed on the cover plate; and in which the security tag is attached to said cover plate.

7. The security collar defined in claim 1 wherein each of the housing member has a generally semi-circular side wall; in which the spaced projections of the housing members include an arcuate projection extending inwardly from each of the side walls and a chordal-shaped projection formed on each of the side walls generally at the center of curvature of said side walls and spaced from said arcuate projections.

8. The security collar defined in claim 1 in which each of the housing members includes a plurality of locking fingers mutually engageable with each other to secure the housing members in locked position.

9. The security collar defined in claim 8 in which the locking fingers of one of the housing members are slidably linearly moveable with respect to the locking fingers on the other of said housing members for locking and unlocking the fingers with respect to each other.

10. The security collar defined in claim 1 in which each of the housing members has a generally semi-circular configuration pivotally connected together at one end and swingable between open and closed positions.

11. In combination, a container for storing a plurality of discs in a stacked relationship and a security collar mounted on the container and selectably lockable thereon to prevent opening of the container;
  said container having a base for supporting the discs in a stacked relationship and a cover removably mounted on the base and enclosing the discs to prevent removal of the discs from the container when the collar is in a closed locked position;
  the security collar being mounted on the base preventing removal of the cover from the base when in the closed locked position;
  a lock mechanism carried by the collar for locking the collar in the closed locked position; and
  a security tag carried by the collar.

12. The combination defined in claim 11 wherein the container cover and base include a plurality of mutually engageable latching tabs to removably latch the cover on the base; in which the security collar includes a pair of housing members joinable together in the closed locked position; and in which said housing members include spaced projections which trap the latching tabs of the container base and cover therebetween when the housing members are in the closed locked position to prevent removal of the base and cover from the locking collar.

13. The combination defined in claim 12 in which each of the housing members has a generally semi-circular configuration pivotally connected together at one end and swingable between open and closed positions.

14. The combination defined in claim 12 in which each of the housing members includes a plurality of locking fingers mutually engageable with each other to secure the housing members in the closed locked position.

15. The combination defined in claim 14 in which the locking fingers have generally L-shaped configurations.

16. The combination defined in claim 15 in which the locking fingers of one of the housing members are slidably linearly moveable with respect to the locking fingers on the other of said housing members for locking and unlocking the fingers with respect to each other.

17. The combination defined in claim 11 in which the lock mechanism includes magnetically attractable locking plungers extendable between the housing members when in the closed position.

18. The combination defined in claim 11 wherein each of the housing members is formed with a raised external arcuate rib which is complementary with an arcuate rib formed on the base of the container to enable a lower container to stackably receive the security collar of an adjacent container in a nested relationship thereon.

19. The combination defined in claim 11 wherein one of the housing members includes a slide plate and a slider slidably mounted for linear movement on said slide plate, said slider being provided with a plurality of locking fingers lockingly engageable with a plurality of locking fingers fixed on the other housing member to secure the housing members in locked position.

20. A security collar for a merchandise display package having a base and a closure cover forming a container for holding merchandise, said collar comprising:
  a pair of housing members pivotally joined together and moveable between open and closed positions;
  a lock mechanism carried by the collar for locking the housing members in the closed position;
  a security tag carried by the collar; and
  projections formed on the housing members for trapping the base and cover of the display package therebetween when the housing members are in the locked position.

* * * * *